United States Patent [19]

Hesse et al.

[11] 4,220,277

[45] Sep. 2, 1980

[54] AXLE BODIES

[75] Inventors: Heinrich Hesse; Rolf Lückeville, both of Bielefeld; Franz-Josef Henrichs, Verl, all of Fed. Rep. of Germany

[73] Assignee: Mannesmann Aktiengesellschaft, Mannesmannufer, Fed. Rep. of Germany

[21] Appl. No.: 10,072

[22] Filed: Feb. 7, 1979

[30] Foreign Application Priority Data

Feb. 8, 1978 [DE] Fed. Rep. of Germany ....... 2805729

[51] Int. Cl.$^3$ ...................... B23P 15/00; B23K 31/02; B21D 22/24
[52] U.S. Cl. .................................. 228/173 F; 29/463; 72/256; 72/367
[58] Field of Search ...................... 228/173 R, 173 F; 29/463; 72/256, 267, 354, 358, 367

[56] References Cited

U.S. PATENT DOCUMENTS

| | | | |
|---|---|---|---|
| 1,621,007 | 3/1927 | Ford | 29/463 X |
| 2,368,695 | 2/1945 | Wilber | 29/463 X |
| 2,370,641 | 3/1945 | Dewey | 228/173 F X |
| 2,752,673 | 7/1956 | Williams | 29/463 |
| 3,927,449 | 12/1975 | Gibble et al. | 72/267 X |
| 4,100,781 | 7/1978 | Zawacki et al. | 72/354 X |

*Primary Examiner*—Francis S. Husar
*Assistant Examiner*—Kenneth J. Ramsey
*Attorney, Agent, or Firm*—Smyth, Pavitt, Siegemund, Jones & Martella

[57] ABSTRACT

An axle body is made by extruding a blank for forward extruding a neck portion and backward extruding a hollow shell portion, a transition zone is also produced by forward extrusion; the resulting shell portion is rolled into a nonround cross section, of, possibly, different wall thickness; two such shell portions are welded at their respective ends.

5 Claims, 9 Drawing Figures

U.S. Patent  Sep. 2, 1980  Sheet 1 of 2  4,220,277
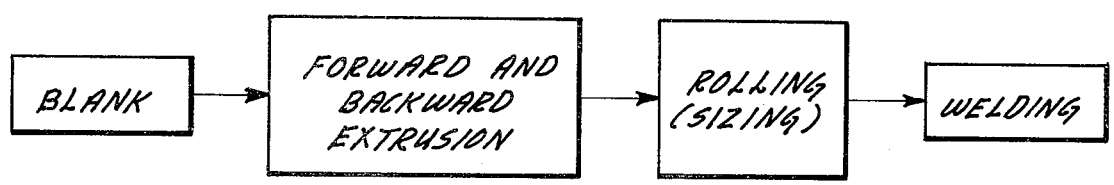
Fig.1
Fig.2
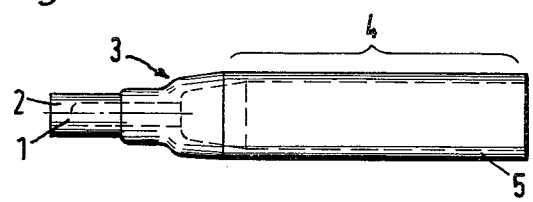
Fig.2a
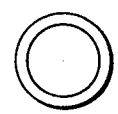
Fig.3
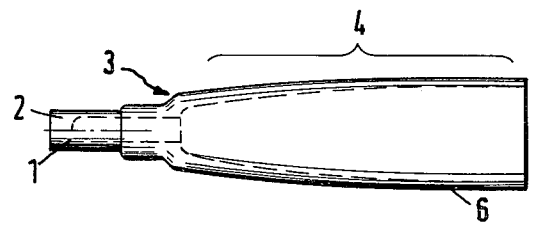
Fig.3a
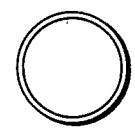

AXLE BODIES

BACKGROUND OF THE INVENTION

The present invention relates to improvements in the making of axle or shaft bodies and more particularly the invention relates to the manufacturing of axle or shaft bodies up to the point of providing such a body with the overall contour so that it can be used subsequently in contour and surface finishing operations. The particular axle body is to be used for and in vehicles.

The known method for making an axle body usually employs a seamless or welded tube or pipe to be used as the work. The ends of that tube or pipe are forged or swaged to reduce the diameter of these end portions and to form them into axle necks or journals. The German printed patent application No. 2,226,304 describes a method according to which one may use matching half shells which may have been preshaped as to the neck portion, and these half shells are interconnected, for example, by welding along adjoining edges, and in a plane which includes the axis of the shaft to be made. If the neck is not already preshaped as part of the shell, the neck parts are subsequently welded or flanged thereto.

All these methods are multistep processes and require rather complicated tools and devices. In some instances, the neck or journal must not have an inner bore so that separate making of the necks and adding them by means of flanging or welding are additional working steps.

Furthermore, certain portions of the axle body such as the areas against which pressure rings will bear, require a local accumulation of material so that the body is thicker in these areas. This in return requires also welding on or flanging of neck portions.

It must be observed that each of the methods results in a structure which will react differently under load and will exhibit different distributions of stress. Moreover, the structures will differ as to endurance and fatigue limits and in no case an an optimum be expected as to these parameters. Particularly, it will be necessary to oversize one part or another to meet all of the strength and load bearing requirements.

DESCRIPTION OF THE INVENTION

It is an object of the present invention to provide a new and improved method of making axle bodies in the sense that a semi-finished product is made out of which an axle body can be made by further finishing operations. This axle is to exhibit a stress distribution and fatigue limit which are improvements over the prior art. Moreover, the shaft body is to have a lower weight but should have the required local accumulation of material wherever needed, and the contour should be free from holes and cracks.

In accordance with the preferred embodiment of the present invention, it is suggested to provide a rather accurately sized blank or work by means of press working and heating the same to a hot working temperature of, for example, 1,300 degrees centigrade. Next, an axle body half is extruded from the blank where by particularly a neck and transition portion is made by forward flow extrusion while a tubular body or shell is made from that blank by backward flow extrusion. This semifinished product as resulting from the extrusion, is subsequently contour rolled and sized into an off round cross sectional contour. The result is a semifinished product which is, for example, a half or one-half of a shaft or axle body, and two of such halves are welded together, the plane of joining extending transversely to the axis of the resulting body. Thus, it is a specific feature of the invention that a semifinished product is made by combined forward and backward extrusion to make one-half of a axle body and the dividing plane for the resulting axle is transversed to the axis of such a body; two such semifinished shells with integral neck each are joined to make the axle body in its entirety.

DESCRIPTION OF THE DRAWING

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 1 is a flow chart of the overall process in accordance with the invention;

FIGS. 2 and 2a are respectively side and end views of an intermediate or semifinished product as it results from extrusion;

FIGS. 3 and 3a are similar views of a modified product;

FIG. 5 is a diagram showing various shapes and end view to be made as per the sizing step depicted in the FIGS. 4 and 4a.

Figure 4:
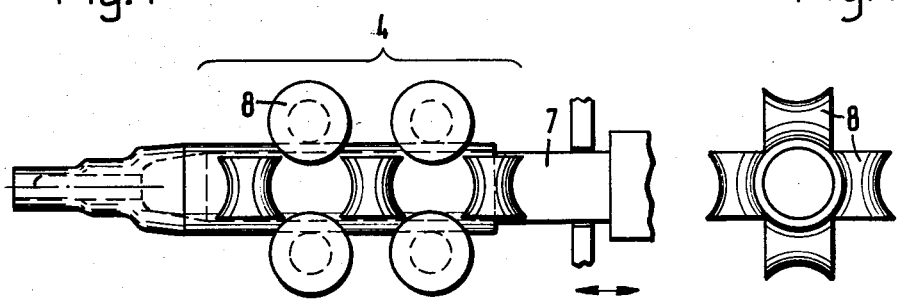
FIGS. 4 and 4a are respectively side and end views of such a semifinished product as it is being rolled and sized.

Proceeding to the detailed description of the drawings. The process begins by providing a bloom, billet, or ingot, and press working it into a work or blank of accurate dimensions. Moreover, the work or blank is heated to a temperature which will facilitate extrusion. For steel, this temperature should be about 1,300 degrees centigrade. Next, the thus prepared work or blank is extruded preferably in a punching press for a combination of forward and backward extrusion. The press parts are contoured such that a smaller diameter portion, which will become the neck 2 (FIGS. 2 and 2a) results from forward extrusion while the shell and tube part 4 for one-half of a shaft or axle body to be made results from backward flow during the extrusion process. A transition portion 3 in between is also made by forward extrusion and includes a boundary zone between forward and backward extrusion. This transition zone exhibits an accumulation of material for enhancing the strength of the product. The resulting neck is shown with a closed end 1 but could be opened if such a construction were desired.

FIGS. 2 and 2a show a presemifinished product in which the main portion is a cylindrical shell having a constant thickness of its wall 5 but the wall thickness decreases in the transition zone 3 from a rather thick portion resulting from material accumulation in a zone in which the axle body is to be quite thick. The constant diameter and constant wall thickness shell portion 4 constitutes the continuation of this transition zone. FIGS. 3 and 3a show a presemifinished product of generally similar configuration, but the shell portion 4 gradually increases in diameter and its wall 6 gradually decreases in thickness i.e. in axial direction taken from the axle end and journal 2.

Figure 4A:
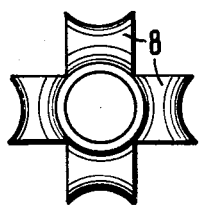
Figure 5:
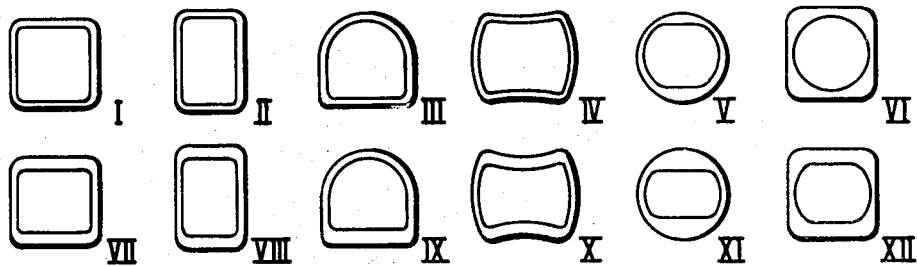

Next, this presemifinished product is sized by means of contour rolling, rollers 8 in FIGS. 4 and 4a, under utilization of an inserted mandrel 7 to obtain one of the various cross sections as shown in examples I through VI as depicted in FIG. 5. The examples VII to XII indicate that during sizing and particularly by means of appropriately chosen contour rollers one or two of the walls of the shell can be increased in thickness relative to the other walls or remaining wall portions.

Figure 6:
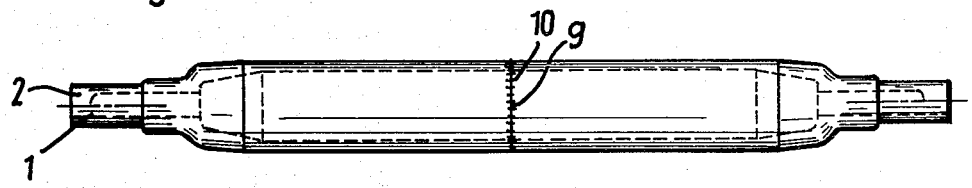
FIG. 6 is a completed axle or shaft body made from two semifinished products which in turn have been made as explained with reference to FIGS. 1-5.

The final semifinished product is one-half of an axle or shaft body comprised of a hollow shell with an integral neck or journal. A complete axle body is made by joining two such bodies of the type described in FIGS. 1-5 the joint being made shell end to shell end. FIG. 6 shows the two semi-finished products welded together resulting in a welding seam 9 whereby a radially inwardly projecting bead is produced for strengthening the joint.

It was found that this partially finished axle or shaft body with integral journals or neck is quite low in weight because over-sizing is not needed. The stress distribution is quite favorable particularly in the neck and transition zones. Also, the fatigue limit is improved and the surface has a better quality than prior art products.

The invention is not limited to the embodiments described above but all changes and modifications thereof not constituting departures from the spirit and scope of the invention are intended to be included.

We claim:

1. Method of making a semi-finished product for use as one half in an axle body, comprising the steps of:
   providing an extrusion blank of particular dimensions and heating the blank to a working temperature;
   extruding the blank by forward extruding a neck portion and backward extruding a hollow shell portion, there being a transition zone between the neck and shell portions being also produced by forward extrusion; and
   rolling the shell portion into a nonround cross section, the wall thickness decreasing gradually at least in the transition zone towards and into the shell portion.

2. Method as in claim 1 the extrusion step being carried out by means of a punch press.

3. Method as in claim 1 the rolling step providing a nonuniform wall thickness around the periphery of the shell portion.

4. The method of making an axle body including making two semi-finished products by means of the steps as set forth in claims 1, 2 or 3 and joining the two products at their respective shell ends.

5. Method as in claim 4 the joining being produced by welding resulting in a radially inwardly extending welding bead.